US007946358B2

(12) United States Patent
Hallundbæk

(10) Patent No.: US 7,946,358 B2
(45) Date of Patent: May 24, 2011

(54) SEQUENCE VALVE AND A DOWNHOLE TRACTOR

(76) Inventor: Jorgen Hallundbæk, Græsted (DK)

( * ) Notice: Subject to any disclaimer, the term of this patent is extended or adjusted under 35 U.S.C. 154(b) by 0 days.

(21) Appl. No.: 12/735,409

(22) PCT Filed: Jan. 14, 2009

(86) PCT No.: PCT/DK2009/050011

§ 371 (c)(1),
(2), (4) Date: Jul. 14, 2010

(87) PCT Pub. No.: WO2009/089838

PCT Pub. Date: Jul. 23, 2009

(65) Prior Publication Data

US 2010/0288489 A1 Nov. 18, 2010

(30) Foreign Application Priority Data

Jan. 16, 2008 (DK) ................................ 2008 00059

(51) Int. Cl.
*E21B 4/18* (2006.01)
*F16K 31/126* (2006.01)

(52) U.S. Cl. ............................ 175/51; 137/491; 60/426

(58) Field of Classification Search .................... 175/51, 175/97, 106; 60/421, 426; 137/491, 115.01, 137/115.06, 115.16, 115.17; 251/117
See application file for complete search history.

(56) References Cited

U.S. PATENT DOCUMENTS 2,598,233 A 5/1952 Deardorff
3,421,532 A * 1/1969 Davidson ...................... 137/101
3,543,516 A * 12/1970 Treichel ........................ 60/396
4,300,584 A 11/1981 Kosarzecki
5,996,615 A * 12/1999 Zuegner et al. ............... 137/493
6,293,765 B1 9/2001 Peterson
7,766,041 B2 * 8/2010 Tackes et al. ............. 137/625.3

FOREIGN PATENT DOCUMENTS

WO WO 82/01042 4/1982
WO WO 2004/072433 8/2004

OTHER PUBLICATIONS

International Search Report for PCT/DK2009/050011, mailed Mar. 19, 2009.
Written Opinion of the International Searching Authority for PCT/DK2009/050011, mailed Mar. 19, 2009.

* cited by examiner

*Primary Examiner* — Kenneth Thompson
(74) *Attorney, Agent, or Firm* — Nixon & Vanderhye P.C.

(57) ABSTRACT

The invention relates to a sequence valve for use in a hydraulic plant, which sequence valve has a pressure-controlled slide valve (5) with a spring return and in a starting position defines a first cavity (10), which cavity is connected with a tank and the hydraulic plant, and in a second, pressurized position closes off the connection with the tank. The cavity is connected to a second cavity (18) via a channel (15, 16, 17) in the slide valve, and the second cavity is adapted to be connected with a pump via a throttle (20) and is positioned on the same side of the slide valve as the spring (7). The sequence valve has a third cavity (19), which is adapted to be connected with the pump and is positioned on the opposite side of the slide valve from the spring, and the second and the third cavity are connected with each other via a fixed throttle with a short flow channel. The invention also relates to downhole tractor with the sequence valve.

6 Claims, 2 Drawing Sheets

SEQUENCE VALVE AND A DOWNHOLE TRACTOR

This application is the U.S. national phase of International Application No. PCT/DK2009/050011 filed 14 Jan. 2009, which designated the U.S. and claims priority to DK Application No. PA200800059 filed 16 Jan. 2008, the entire contents of each of which are hereby incorporated by reference.

FIELD OF THE INVENTION

The present invention relates to a sequence valve for use in a hydraulic system, which sequence valve has a pressure-controlled sliding part with a return spring and in a starting position defines a first cavity, which cavity is connected with a tank and the hydraulic system, and in a second, pressurised position closes off the connection with the tank. The cavity is connected to a second cavity via a channel in the sliding part, and the second cavity is adapted to be connected with a pump via a throttle and is positioned on the same side of the sliding part as the spring. The invention also relates to a downhole tractor.

BACKGROUND ART

It is known to control hydraulic engines in a hydraulic system by means of control valves or sequence valves, which are coupled in between the engines and the respective pumps. A sequence valve to be used in this connection has a pressure-controlled sliding part with a return spring and in a starting position defines a first cavity, which cavity is connected with a tank and the hydraulic system, and in a second, pressurised position closes off the connection with the tank. The cavity is connected to a second cavity via a channel in the sliding part, and the second cavity is adapted to be connected with a pump and is positioned on the same side of the sliding part as the spring. When starting the pump, oil is led to the above-mentioned cavity which both directs oil to the engines and to the tank into a pressure means which is connected with the pump and which brings the sliding part to its pressurised position.

Known sequence valves have required the use of throttle able to withstand up to approximately 200 bar, which entails that the throttle must be relatively narrow and thus easily clogs up.

SUMMARY OF THE INVENTION

An object of the present invention is, at least partly, to overcome the above disadvantages and drawback of the prior art and to provide an improved sequence valve which enables the pump to start slowly, which again enables the engine driving this pump to start lightly at low energy consumption (power consumption), thus making it cheap to run (economic run).

This is accomplished by a solution in accordance with the present invention by a sequence valve for use in a hydraulic system, which sequence valve has a pressure-controlled sliding part with a return spring and in a starting position defines a first cavity, which cavity is connected with a tank and the hydraulic system, and in a second, pressurised position closes off the connection with the tank, the cavity being connected to a second cavity via a channel in the sliding part, and the second cavity being adapted to be connected with a pump via a throttle and positioned on the same side of the sliding part as the spring, wherein the sequence valve has a third cavity, which is adapted to be connected with the pump and is positioned on a side of the sliding part opposite the spring, and wherein the second and the third cavity are connected with each other via a throttle with a flow channel.

It is thus obtained that, when starting the pump slowly, the fluid flowing through the throttle, which constitutes a short flow channel, is independent of the viscosity. A diaphragm is thus formed from which the fluid flows to the first cavity and thus to the tank and the connected engines in the hydraulic system. As the pressure is built, the sliding part is forced in the opposite direction from the spring, by which the connection to the tank is closed off and the hydraulic system is filled and finally brought to operate.

In one embodiment, the throttle may be positioned centrally in the sliding part.

The invention further relates to a hydraulic system for running both a large and a small engine or a plurality of large and small engines, which via each their pressure-controlled sequence valve are connected with a large pump and a small pump, respectively. The sequence valves have a spring functioning as a return spring.

By a large and a small engine is meant that there is a first engine which is larger than a second engine, and by a large and a small pump is meant that there is a first pump which is larger than a second pump. The first pump drives the first engine or engines and the second pump drives the second engine or engines. The sequence valve of the first pump is a sequence valve as described above, whereas the sequence valve of the second pump is controlled by the pressure of fluid between the sequence valve of the first pump and the corresponding first engine or engines.

In a known system for running several engines, the rather large pressure created by the first sequence valve (non-return valve) was able to initiate the flow to the first engines and the second sequence valve positioned between the large pump and the large engines. Such a system requires a rather large amount of energy already to begin with.

According to the invention, the sequence valve of the small or first pump can be a sequence valve according to the invention, where the pump via a pipe is connected with a third cavity on the opposite side of the sliding part from the spring, whereas the second and the third cavity are connected with each other via a fixed throttle with a short flow channel, and whereas the sequence valve of the large or second pump is controlled by the pressure of fluid between the sequence valve of the small or first pump and the corresponding small or first engines.

In this system, the small or first pump will be able to start at low energy, while the fluid flows through the throttle to both the small or first engines and the tank, until the pressure in front of the throttle becomes so large that the sequence valve closes off the connection with the tank and the pressure behind the throttle becomes large enough to drive the small or first engines and, at the same time, activate the sequence valve connected with the large or second pump. When the latter sequence valve is activated, its connection with the tank is closed off. The pressure in the pipes leading towards the large or second engines is thus increased to such an extent that the large or second engines may be driven as desired.

BRIEF DESCRIPTION OF THE DRAWINGS

The invention and its many advantages will be described in more detail below with reference to the accompanying schematic drawings which, for the purpose of illustration, show some non-limiting embodiments and in which.

Both the drawings are schematic and not necessarily to scale, and they show only those parts necessary to elucidate the invention, other parts being omitted or merely suggested.

DETAILED DESCRIPTION OF THE INVENTION

Figure 1:
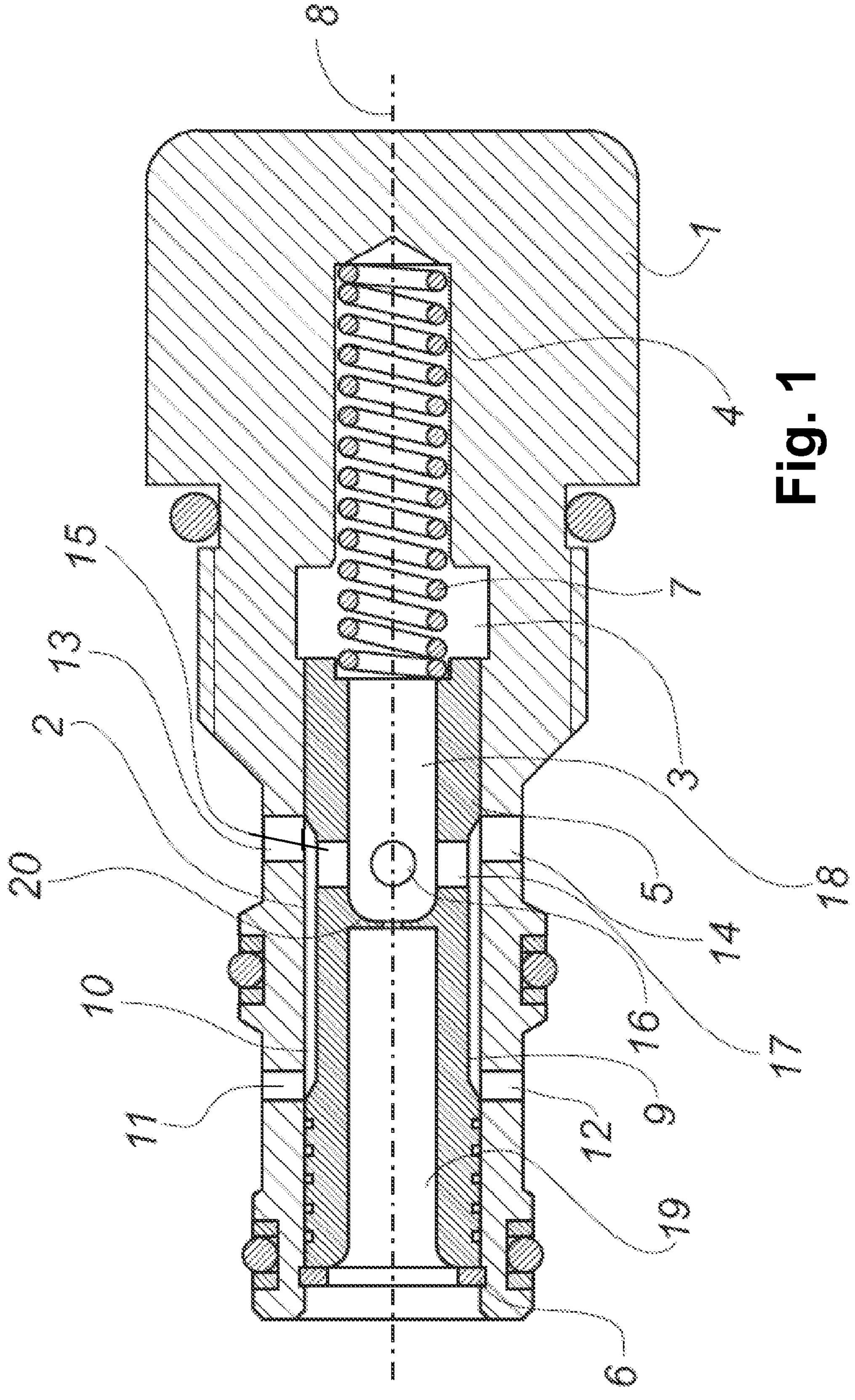
FIG. 1 shows a cross-section of a sequence valve according to the invention.

The sequence valve shown in FIG. 1 comprises a housing 1 with an axial bore 2 extending as a hole into the housing from one end of the housing. At the bottom of the bore is a part of the bore having a slightly larger diameter followed by a coaxially continuing extension 4 of the bore having a slightly smaller diameter. A sliding part 5 is arranged in the bore 2 and held in place by means of a locking ring 6 provided in a corresponding groove close to the entrance of the bore 2. The sliding part 5 is pressed against the locking ring 6 by means of a spring 7 arranged in the extension 4 of the bore 2 and abutting the innermost end of the sliding part 5.

Both the housing 1 and the sliding part 5 are in the form of solids of revolution that are rotationally symmetric around a common axis 8. On its outside, the sliding part 5 has a circumferential recess 9 which together with the inside of the bore 2 forms a first cavity 10. The recess 9 has such an axial extension so as to be connected with radially through-going holes 11, 12, 13, 14 in the housing 1 in each of its ends when the sliding part 5 is in a starting position where it is pressed against the locking ring 6 by means of the spring 7. The holes 11, 12, which are adapted to be connected with a tank, are positioned closest to the locking ring 6, whereas the holes 13, 14, which are adapted to be connected with a number of engines to be driven by means of hydraulic fluid, are positioned furthest away from the locking ring 6.

When the sliding part 5 is moved away from the plant towards the locking ring 6, it is brought into a functioning position (not shown) in which the connection with the holes 11, 12 leading to the tank is closed off. The recess 9 in the sliding part 5 is connected with a second cavity 18 via a number of radially extending holes 15, 16, 17, which second cavity is in direct contact with the bore 2 at the end of the sliding part abutting the spring 7. In the end of the sliding part 5 opposite the spring 7, a third cavity 19 is positioned which is in direct contact with the side of the sliding part which in the starting position abuts the locking ring 6. The adjacent end of the housing 1 is adapted to be connected with a pump in a way which is not shown. The second 18 and the third cavity 19 are connected with each other centrally in the sliding part 5 by means of an opening in the form of a diaphragm 20, which has a short axial extension and which during use leads the fluid flowing into the third cavity 19 from the pump through a throttle when the fluid passes into the second cavity 18. The diaphragm 20 has a size and an axial extension making the passage of fluid independent of the viscosity.

During use of the sequence valve, fluid flows from the pump into the third cavity 19 from which it, when the pump is started slowly, flows through the diaphragm 20 and into the second cavity 18 and further on into the first cavity 10 from where it flows both to the tank via the holes 11, 12 and to the connected hydraulic engines via the holes 13, 14. As the pump and the respective engine are heated, pressure is built in the third cavity 19 moving the sliding part 5 towards the spring 7 causing it to compress the spring. The connection of the sequence valve with the tank is thus closed off, and the connected hydraulic engines are started. The sequence valve according to the invention thus enables a start of the pump and the respective engine at low energy consumption (power consumption). It is thus possible to slowly heat the pump and the engine until they are well suited to drive the connected hydraulic engines, such as pistons or the like.

Figure 2:
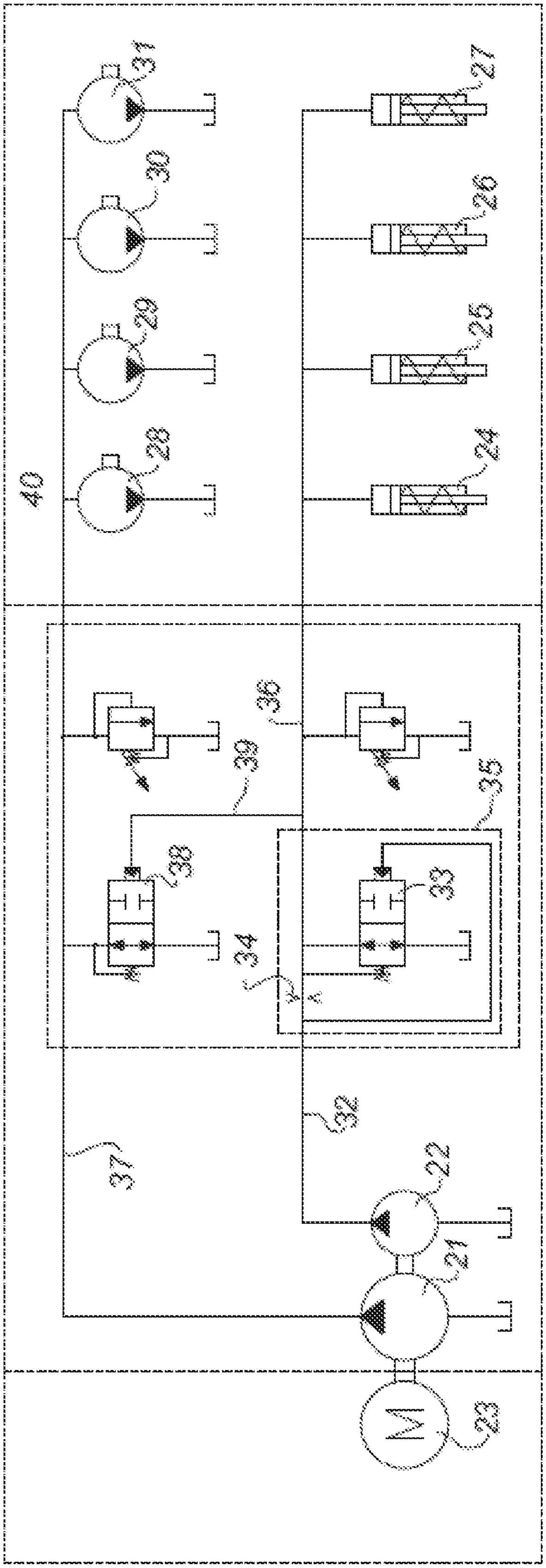
FIG. 2 shows a diagram of a hydraulic system according to the invention.

FIG. 2 shows a plant where a sequence valve according to the invention may be employed. It shows a diagram of two pumps 21, 22 which are adapted to be driven by means of a common engine 23. One of the pumps 22 is a relatively small pump, whereas the other pump 21 is a relatively large pump adapted to drive a number of large engines 28-31.

The small or first pump 22 is connected with a sequence valve according to the invention via a pipe 32. The sequence valve in question is a two-way valve 33 connected with a throttle 34. The sequence valve including the throttle is indicated by means of the dotted line 35. This sequence valve is connected with the engines 24-27 via a pipe 36.

The large pump 21 is connected with a sequence valve 38 in the form of a two-way valve via a pipe 37. This sequence valve 38 is a known frequency valve, and it is controlled by means of the pressure in the pipe 36 via a pipe 39. The sequence valve 38 is connected with the large engines 28-31 via a pipe 40.

When the engine 23, and thus the small pump 22, are started slowly, fluid flows towards the sequence valve 35 where the hydraulic fluid or hydraulic liquid to begin with flows both to the tank and towards the connected engines 24-27 until the connection with the tank is closed off and the pressure rises in the pipe 36. When the pressure in the pipe 36 reaches a predetermined level, the small engines 24-27 are activated. At the same time, the increasing pressure will affect the sequence valve 38 via the pipe 39 until the connection of the sequence valve 38 with the tank is closed off and the pressure in the pipe 40 can be built up, when the large pump 21 is activated, until the large engines 28-31 can be activated, too.

The shown system is suitable for use in a so-called downhole tractor, such as a Well Tractor® which is marketed by the present applicant. The small engines 24-27 are a number of pistons for pushing out a corresponding number of arms which, upon activation, swing out around a hinged connection with the housing of the Well Tractor® itself. The free ends of the arms are each provided with a wheel, and the wheels are driven by the large engines 28-31 which, according to the present system, are only activated when the wheels contact the inside of a pipeline. The Well Tractor® can thus be brought to move forwards or backwards in the pipeline.

The dimensions of the throttle in the axial direction and with respect to diameter are adapted to fit the power of the spring 7 and the area around the entrance of the bore 2. If e.g. the diameter of the entrance of the bore 2 is 10 mm and the power of the spring is 2-10 N, the throttle 20 will have a diameter of approximately 0.3-0.7 mm, which is a rather large hole when hydraulics is concerned. Such a hole will allow for the passage of dirt etc. The axial extension of the throttle 20 will be approximately the same as the diameter, i.e. 0.3-0.7 mm.

The first cavity 10 is connected to a second cavity 18 via a channel 15, 16, 17 in the sliding part 5, which channel being a hole in the sliding part 5.

By a return spring is meant a spring able to return the sliding part to its initial position.

In the description, the invention is disclosed as a system comprised of several small or first engines and several large or second engines; however, the invention also relates to a system comprising only one first or small engine and one second or large engine.

Although the invention has been described above in connection with a preferred embodiment, it will be evident for a person skilled in the art that several modifications are conceivable without departing from the invention.

The invention claimed is:

1. Sequence valve for use in a hydraulic system, which sequence valve has a pressure-controlled sliding part (5) with a return spring and in a starting position defines a first cavity (10), which cavity is connected with a tank and the hydraulic system, and in a second, pressurised position closes off the connection with the tank, the cavity being connected to a second cavity (18) via a channel (15, 16, 17) in the sliding part, and the second cavity being adapted to be connected with a pump via a throttle (20) and positioned on the same side of the sliding part as the spring (7), wherein the sequence valve has a third cavity (19), which is adapted to be connected with the pump and is positioned on a side of the sliding part opposite the spring, and wherein the second and the third cavity are connected with each other via a throttle with a flow channel.

2. Sequence valve according to claim 1, wherein the throttle is positioned centrally in the sliding part.

3. Hydraulic system for running both a first (28-31) and a second engine (24-27), the first engine being larger than the second engine, which engines via each their pressure-controlled sequence valve (35, 38) are connected with a first pump (21) and a second pump (22), respectively, wherein the sequence valve of the second pump is a sequence valve according to claim 1, whereas the sequence valve of the first pump is controlled by the pressure of fluid between the sequence valve of the second pump and the corresponding second engines.

4. Hydraulic system according to claim 3, comprising a plurality of first engines and a plurality of second engines.

5. Downhole tractor comprising a sequence valve according to claim 1.

6. Downhole tractor comprising a hydraulic system according to claim 3.

* * * * *